US011653596B2

United States Patent
Garton et al.

(10) Patent No.: US 11,653,596 B2
(45) Date of Patent: May 23, 2023

(54) NEAR REAL-TIME SIGNAL CORRECTION ON A HARVESTING MACHINE

(71) Applicant: Deere & Company, Moline, IL (US)

(72) Inventors: Michael S. Garton, East Moline, IL (US); Alexander B. Lassers, Davenport, IA (US)

(73) Assignee: Deere & Company, Moline, IL (US)

( * ) Notice: Subject to any disclaimer, the term of this patent is extended or adjusted under 35 U.S.C. 154(b) by 648 days.

(21) Appl. No.: 16/718,867

(22) Filed: Dec. 18, 2019

(65) Prior Publication Data

US 2021/0185913 A1 Jun. 24, 2021

(51) Int. Cl.
*A01D 41/127* (2006.01)
*A01B 79/00* (2006.01)

(52) U.S. Cl.
CPC ........ *A01D 41/1271* (2013.01); *A01B 79/005* (2013.01)

(58) Field of Classification Search
CPC .............. A01D 41/1271; A01D 41/127; A01B 79/005; G05D 1/021
See application file for complete search history.

(56) References Cited

U.S. PATENT DOCUMENTS

| | | | | |
|---|---|---|---|---|
| 5,535,577 | A * | 7/1996 | Chmielewski | A01D 75/287 56/208 |
| 9,506,786 | B2 * | 11/2016 | Strnad | G01G 11/00 |
| 9,645,006 | B2 | 5/2017 | Phelan et al. | |
| 9,958,301 | B2 * | 5/2018 | Kirk | A01D 29/00 |
| 10,028,435 | B2 | 7/2018 | Anderson et al. | |
| 10,188,037 | B2 | 1/2019 | Bruns et al. | |
| 10,260,931 | B2 * | 4/2019 | Acheson | G01F 13/003 |
| 10,716,256 | B2 * | 7/2020 | Rhodes | A01D 41/1272 |
| 10,820,503 | B2 * | 11/2020 | Advani | A01D 41/1272 |
| 10,980,177 | B2 * | 4/2021 | Ueda | A01D 41/1275 |
| 2013/0317696 | A1 | 11/2013 | Koch et al. | |
| 2019/0223379 | A1 * | 7/2019 | Gilmore | B60W 10/30 |

FOREIGN PATENT DOCUMENTS

| | | | |
|---|---|---|---|
| DE | 60132018 T2 | 4/2008 | |
| EP | 0960558 B1 | 12/1999 | |
| WO | WO-0241687 A2 * | 5/2002 | .......... A01B 79/005 |

\* cited by examiner

*Primary Examiner* — Manuel A Rivera Vargas
*Assistant Examiner* — Yaritza H Perez Bermudez
(74) *Attorney, Agent, or Firm* — Josehp R. Kelly; Kelly, Holt & Christenson, PLLC

(57) ABSTRACT

A dynamic event detection system detects dynamic events, based on a sensor signal, on a mobile harvester. A dynamic event correction system identifies a correction magnitude, corresponding to the detected dynamic event, and a correction timing. The dynamic event correction system applies a correction, using the correction magnitude and correction timing, to a performance metric value generated from a performance metric sensor.

19 Claims, 10 Drawing Sheets

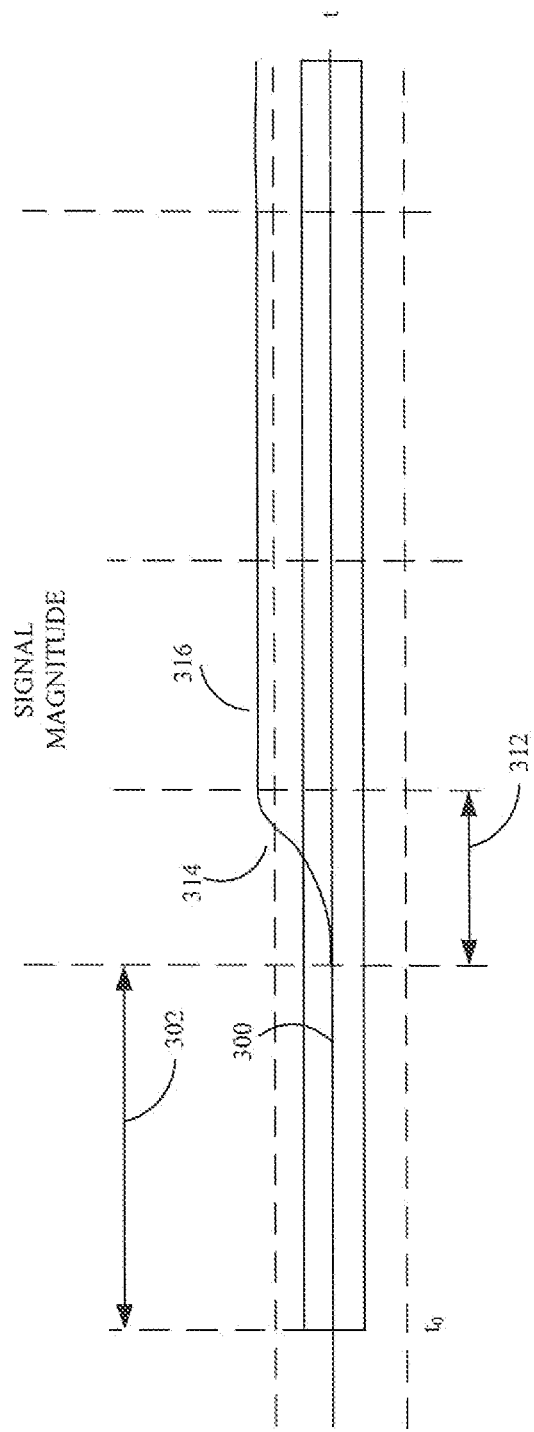

NEAR REAL-TIME SIGNAL CORRECTION ON A HARVESTING MACHINE

FIELD OF THE DESCRIPTION

The present description relates to agricultural equipment. More specifically, the present description relates to near real-time correction of sensor data on a mobile harvesting machine.

BACKGROUND

There are many different types of agricultural machines, some of which include agricultural harvesters. One such agricultural harvester is a combine harvester (or combine).

In operation, as the combine moves through a field, harvesting crop, it is not uncommon for the combine to have sensors configured to sense the amount of material harvested at different locations. For instance, the combine can have a mass flow sensor within the grain processing elements of the combine, that sense an amount of material flowing through the combine at any given time. These signals can be used to generate a yield value indicative of yield in the field being harvested.

There is a delay between when a combine header encounters the crop, and when the yield for that crop is sensed. This is due to processing delays encountered by the crop in traveling through the grain processing elements of the combine. Thus, some current systems apply a delay time, to the sensed yield values, to generate an indication of where, geographically, the yield value was taken from.

The discussion above is merely provided for general background information and is not intended to be used as an aid in determining the scope of the claimed subject matter.

SUMMARY

A dynamic event detection system detects dynamic events, based on a sensor signal, on a mobile harvester. A dynamic event correction system identifies a correction magnitude, corresponding to the detected dynamic event, and a correction timing. The dynamic event correction system applies a correction, using the correction magnitude and correction timing, to a performance metric value generated from a performance metric sensor.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

FIG. 2C shows another example of a sensor response to a dynamic event.

DETAILED DESCRIPTION

Figure 1:
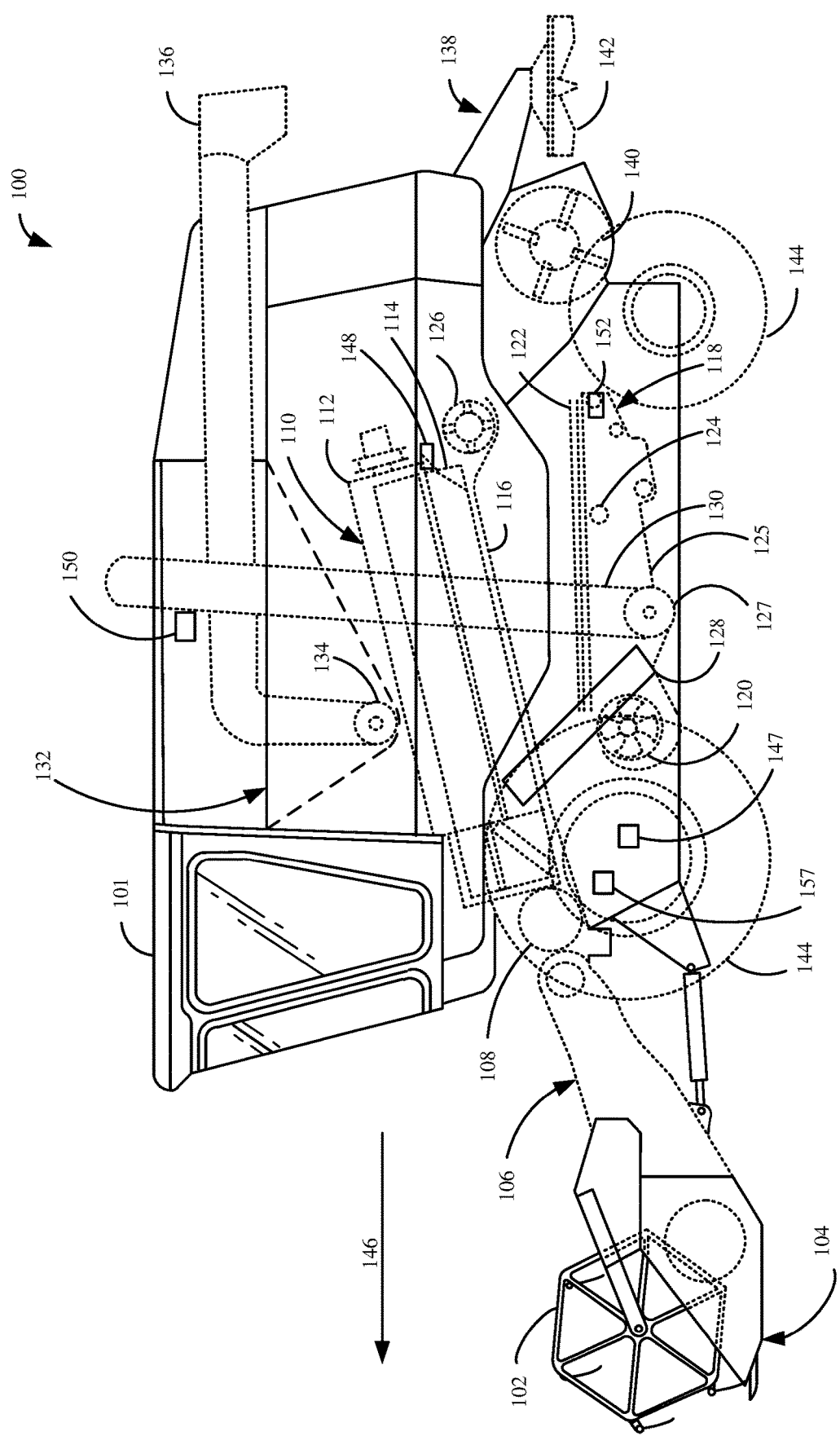
FIG. 1 is a partial pictorial, partial schematic, illustration of a mobile agricultural harvesting machine (a combine harvester).

As described above, it is not uncommon for combine harvester or other mobile agricultural harvesting machines, to have sensors that are configured to sense performance characteristics of the harvesting operation, such as yield, crop loss, etc. It has been found that multiple classes of artifacts can be induced on a combine harvester by the dynamics of the harvest process. These artifacts affect the yield signal (and other performance characteristic sensor signals generated by the combine harvester, such as loss), rendering them less accurate. These artifacts cause variability in the sensor signal which can be relatively large. For instance, operators routinely can observe a variation in the yield sensor signal of 25%, even in fields that appear to be relatively uniform in yield, to human observers. For example, when the harvesting machine operates in a way that causes grain to shift within the machine, this can cause significant dynamic effects in the grain processing operation that compromise the accuracy of the yield signal. For instance, the efficiency of an auger is sensitive to several factors, including the auger geometry, the fraction that the auger is full, the flighting clearance within the auger housing, and the angle of tilt with respect to gravity. Full augers operate with higher efficiency, thus decreasing transit time of the harvested material across the span of the auger.

When speaking in terms of a combine harvester, when the combine harvester decelerates (such as to make a turn at the end of a row), the grain on the floor sheet in the combine is thrown forward to a position where a cross-auger engages the grain. The cross-auger becomes more full and gains efficiency. A surge of grain is thus moved into the combine sump. The higher fill level of the sump increases the scooping efficiency of the paddles that move the grain into the clean grain tank. Many paddles in sequence on an elevator chain will see significantly increased mass, per paddle. This effect causes a spike in the sensed yield of the combine harvester (in configurations where the sensed yield is sensed by a mass flow sensor which senses the mass flow of grain just before the auger into the clean grain tank). Similarly, rapid increases in speed at the start of a row cause an opposite dynamic affect which results in an artificial dip in the sensed yield. The initial change away from the average yield being sensed may be relatively sharp. In both of these examples, the yield eventually swings in the opposite direction to recover during steady state operation of the combine harvester.

Other examples of these types of dynamic effects, and corresponding artifacts, can also occur. For example, when the combine is operating on a field and is oriented with a leftward tilt (because the terrain tilts in that way), this causes the cross auger to push uphill, against the tilt, decreasing its efficiency and increasing transit time. This starves the sump at the bottom of the paddle chain, decreasing scooping efficiency. A rightward tilt causes the cross auger to flow downhill, increasing its flow and efficiency. This also surges grain into the sump at the bottom of the paddle chain, increasing scooping efficiency.

A downward pitch (with the front of the combine oriented downwardly—such as when the combine is traveling downhill) can cause the auger to be more full, increasing its flow and efficiency. Upward pitch causes the floor sheet to be oriented upwardly, starving the cross auger. These types of accelerations, decelerations, changes in orientation, etc., are dynamic events that induce dynamic, correctible affects or errors in the yield signal.

The present description thus proceeds with respect to a system that identifies multiple classes of dynamic events that have corresponding artifacts that induce variation in the yield signal (or other performance characteristic signal). The system determines a magnitude of the variation, and a timing of the variation in the yield signal, and applies a correction value, based upon the magnitude and timing, to the yield signal.

The present description will proceed with respect to identifying dynamic effects, and correcting them, on a yield signal in a combine harvester, but it will be appreciated that it can be applied to other mobile harvesting machines, and other sensor signals as well. For instance, it can apply to loss signals, where variability in the loss signals is induced by dynamic events. It can be applied to other harvesting machines, such as balers, cotton harvesters, or other machines, where dynamic events introduce errors into sensor signals on those machines as well.

FIG. 1 is a partial pictorial, partial schematic, illustration of an agricultural harvesting machine 100, in an example where machine 100 is a combine harvester (or combine). It can be seen in FIG. 1 that combine 100 illustratively includes an operator compartment 101, which can have a variety of different operator interface mechanisms, for controlling combine 100, as will be discussed in more detail below. Combine 100 can include a set of front end equipment that can include header 102, and a cutter generally indicated at 104. It can also include a feeder house 106, a feed accelerator 108, and a thresher generally indicated at 110. Thresher 110 illustratively includes a threshing rotor 112 and a set of concaves 114. Further, combine 100 can include a separator 116 that includes a separator rotor. Combine 100 can include a cleaning subsystem (or cleaning shoe) 118 that, itself, can include a cleaning fan 120, chaffer 122 and sieve 124. The material handling subsystem in combine 100 can include (in addition to a feeder house and feed accelerator 108) discharge beater 126, tailings elevator 128, clean grain elevator 130 (that moves clean grain into clean grain tank 132) and other augers (such as a cross auger) as well as unloading auger 134 and spout 136. Combine 100 can further include a residue subsystem 138 that can include chopper 140 and spreader 142. Combine 100 can also have a propulsion subsystem that includes an engine (or other power source) that drives ground engaging wheels 144 or tracks, etc. It will be noted that combine 100 may also have more than one of any of the subsystems mentioned above (such as left and right cleaning shoes, separators, etc.).

In operation, and by way of overview, combine 100 illustratively moves through a field in the direction indicated by arrow 146. As it moves, header 102 engages the crop to be harvested and gathers it toward cutter 104. After it is cut, it is moved by cross augers or a draper belt toward a center feed section, through a conveyor in feeder house 106 toward feed accelerator 108, which accelerates the crop into thresher 110. The crop is threshed by rotor 112 rotating the crop against concave 114. The threshed crop is moved by a separator rotor in separator 116 where some of the residue is moved by discharge beater 126 toward the residue subsystem 138. It can be chopped by residue chopper 140 and spread on the field by spreader 142. In other implementations, the residue is simply dropped in a windrow, instead of being chopped and spread.

Grain falls to cleaning shoe (or cleaning subsystem) 118. Chaffer 122 separates some of the larger material from the grain, and sieve 124 separates some of the finer material from the clean grain. Clean grain falls to the clean grain floor 125 and then slides to a lower auger feeding the sump 127 at the bottom of the clean grain elevator 130 which can include an auger or paddle chain and which moves the clean grain upward and deposits it in clean grain tank 132. Residue can be removed from the cleaning shoe 118 by airflow generated by cleaning fan 120. That residue can also be moved rearwardly in combine 100 toward the residue handling subsystem 138.

Tailings can fall to a tailings floor and then be moved, by a tailings auger, to an input side of a tailings elevator 128. The tailings can be moved by tailings elevator 128 and an upper auger back to thresher 110 where they can be re-threshed. Alternatively, the tailings can also be passed to a separate re-threshing mechanism (also using a tailings elevator or another transport mechanism) where they can be re-threshed as well.

FIG. 1 also shows that, in one example, combine 100 can include ground speed sensor 147, one or more separator loss sensors 148, a clean grain camera 150, and one or more cleaning shoe loss sensors 152. Ground speed sensor 147 illustratively senses the travel speed of combine 100 over the ground. This can be done by sensing the speed of rotation of the wheels, the drive shaft, the axle, or other components. The travel speed and position of combine 100 can also be sensed by a positioning system 157, such as a global positioning system (GPS), a dead reckoning system, a LORAN system, or a wide variety of other systems or sensors that provide an indication of travel speed.

Cleaning shoe loss sensors 152 illustratively provide an output signal indicative of the quantity of grain loss by both the right and left sides of the cleaning shoe 118. In one example, sensors 152 are strike sensors (or impact sensors) which count grain strikes per unit of time (or per unit of distance traveled) to provide an indication of the cleaning shoe grain loss. The strike sensors in the cleaning shoe can provide individual signals, or a combined or aggregated signal. It will be noted that sensors 152 can comprise only a single sensor or any number of sensors. Separator loss sensor 148 provides a signal indicative of grain loss in the separator. The sensors associated with the separator can provide separate grain loss signals or a combined or aggregate signal. This can be done using a wide variety of different types of sensors as well. It will be noted that separator loss sensors 148 may also comprise only a single sensor, or multiple sensors.

It will also be appreciated that sensor and measurement mechanisms (in addition to the sensors already described) can include other sensors on combine 100 as well. For instance, they can include a residue setting sensor that is configured to sense whether machine 100 is configured to chop the residue, drop a windrow, etc. They can include cleaning shoe fan speed sensors that can be configured proximate fan 120 to sense the speed of the fan. They can include a threshing clearance sensor that senses clearance between the rotor 112 and concaves 114. They include a threshing rotor speed sensor that senses a rotor speed of rotor 112. They can include a chaffer clearance sensor that senses the size of openings in chaffer 122. They can include a sieve clearance sensor that senses the size of openings in sieve 124. They can include a moisture sensor or sensors that can be configured to sense the moisture level of the material that is passing through combine 100. They can include machine setting sensors that are configured to sense the various configurable settings on combine 100. They can also include a machine orientation sensor that can be any of a wide variety of different types of sensors that sense the orientation or pose of combine 100 many times per second. Crop property sensors can sense a variety of different types of crop properties, such as crop type, crop moisture, relative amount of damaged grain, relative amount of material other than grain (MOG), and other crop properties. They can also be configured to sense characteristics of the crop as they are being processed by combine 100. For instance, they can sense biomass feed rate, as it travels through the feeder house 106. They can sense yield as mass flow rate of grain through elevator 130 (by processing the optical images from camera 150 or using another yield sensor), correlated to a position from which it was harvested (by accounting for processing delays), as indicated by position sensor 157, or provide other output signals indicative of other sensed variables. Some additional examples of the types of sensors that can be used are described below.

Figure 1A:
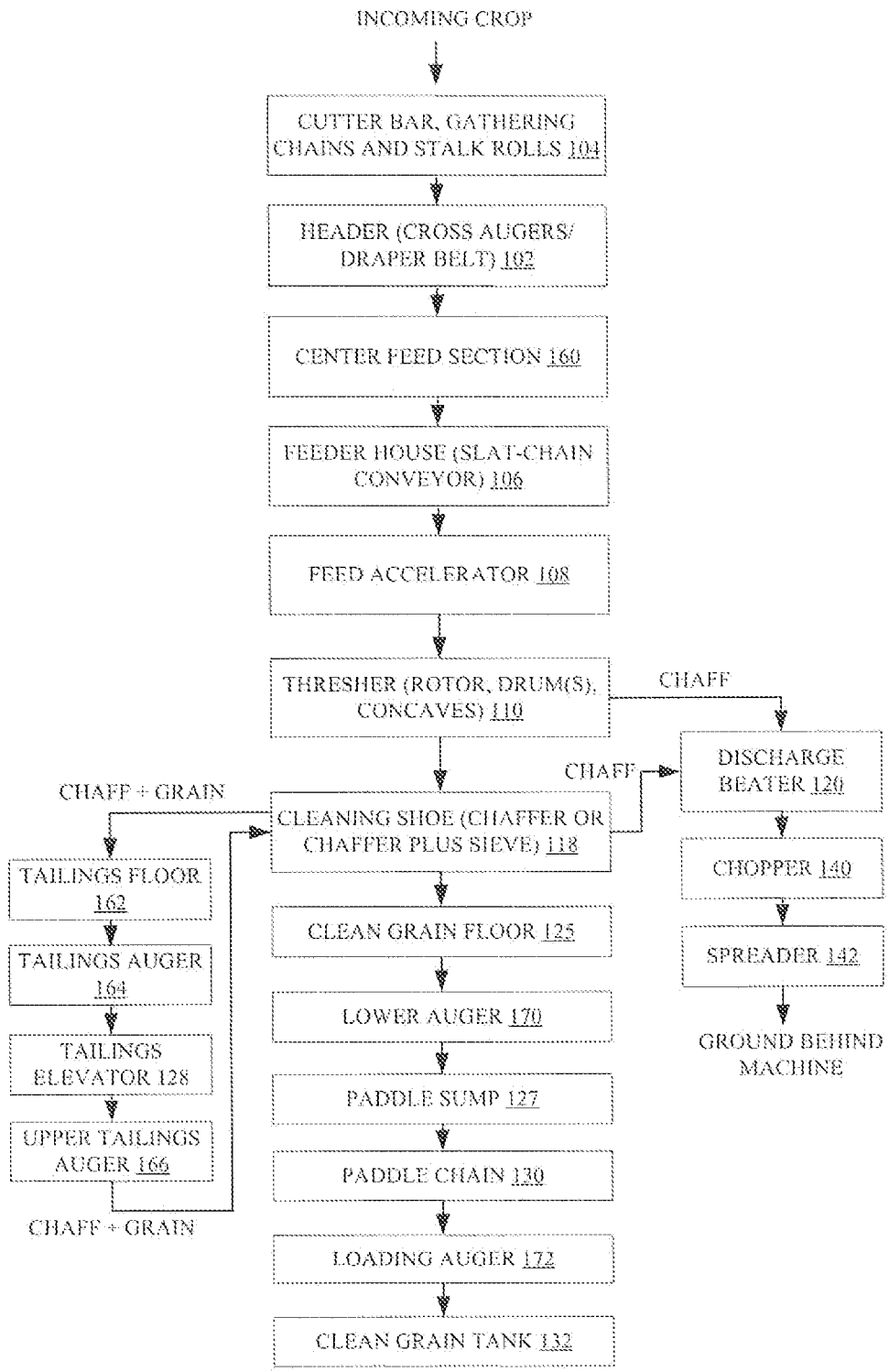
FIG. 1A is a flow diagram illustrating material flow through the combine harvester.

FIG. 1A is a flow diagram illustrating how harvested material flows through combine harvester 100. There are multiple crop flow (or material flow) subsystems in harvester 100, through which the harvested material flows. The material can gather at these subsystems or be depleted at those subsystems. The dynamic events discussed herein affect some particular subsystems by speeding up (or slowing down) material flow through those subsystems. These surges (or lulls) in material flow eventually make their way downstream to the sensors that are used for sensing crop yield.

FIG. 1A shows, for instance, that the incoming crop is first engaged by the cutter bar 104. In other harvesters, gathering chains and stalk rolls can be used, such as in an example where corn is being harvested. The header 102 illustratively has cross augers or a draper belt that moves the crop toward a center feed section 160, where it enters feeder house 106. Feeder house 106 may have a slat-chain conveyor (or other conveyor) that moves the material through feeder house 106 toward feed accelerator 108. Feed accelerator 108 moves the material into thresher (or separator) 110. Chaff from thresher 110 is moved toward the discharge beater 120, chopper 140, and spreader 142 which spreads the material onto the ground behind the machine.

Other material from thresher 110 is moved toward cleaning shoe 118. As described above, cleaning shoe 118 illustratively includes chaffer 122 and it can also include sieve 124. Again chaff plus some grain from cleaning shoe 118 drops to the tailings floor 162 where a tailings auger 164 moves it to tailings elevator 128. Tailings elevator 128 returns the chaff plus grain back to an entry to the cleaning shoe 118. An upper tailings auger 166 moves the grain plus chaff from the output of the tailings elevator 128 to the cleaning shoe 118.

From the cleaning shoe 118, grain falls to the clean grain floor 125 where a lower auger 170 moves it toward paddle sump 127. The paddle chain (or other transfer mechanism) in clean grain elevator 130 moves the grain toward the clean grain bin where a loading auger 172 moves the gain into the clean grain tank 132.

Some of these different crop flow (or material flow) subsystems can be affected by the dynamic events discussed herein. Those dynamic events can speed up or slow down the material flow into and out of the subsystems. Consider, for example, the thresher or separator subsystem 110. In one example, the yield sensor 150 is at the output of paddle chain 130. In an example where the operator quickly decreases the speed of the thresher 110 (e.g., the rotor speed) this will slow material travel through thresher 110. Thus, there can be a significant change in sensed yield after the effect travels downstream and eventually gets to yield sensor 150 at the output end of paddle chain 130. The system discussed herein corrects the sensed yield to deconvolute (factor out and remove) the effect of the thresher speed transient.

Because the rate of crop flow through each subsystem illustrated in FIG. 1A is a function of the amount of crop in that subsystem, the present discussion proceeds with respect to an example in which the subsystems are modeled by a crop flow model. Each of the subsystems illustrated in FIG. 1A can be represented by one or more equations. Integrating time with discrete steps through the equations yields a model-based correction to the timeline of material flow through the machine, prior to reaching the yield sensor 150. The equations in the model that represent each of the subsystems may range from relatively simple representations (such as constants or approximations) to relatively detailed differential equations. Similarly, some subsystems can be represented by an empirically determined function.

Figure 2:
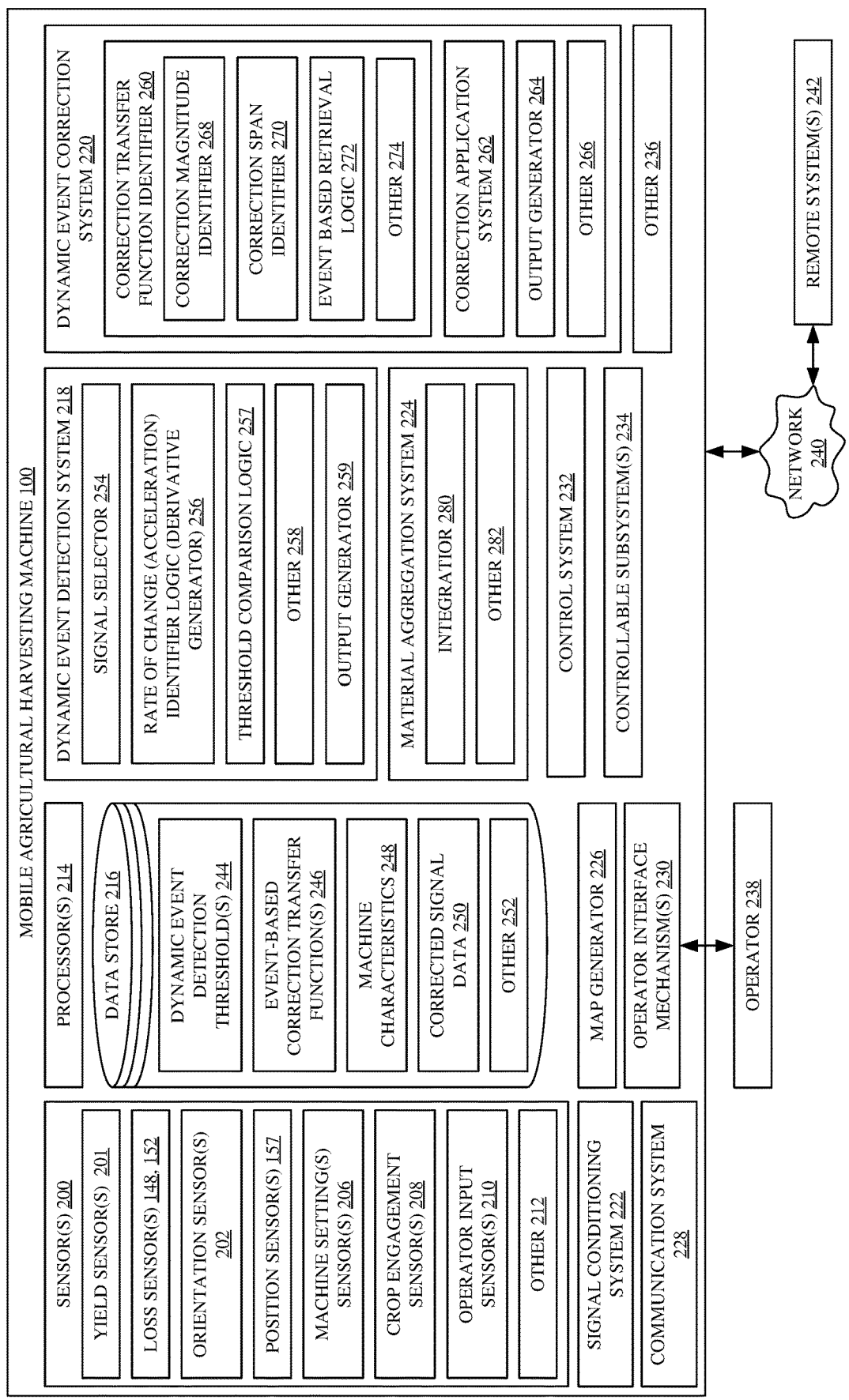
FIG. 2 is a block diagram showing one example of the mobile agricultural harvesting machine, in more detail.

FIG. 2 is a block diagram showing one example of mobile agricultural harvesting machine 100 in more detail. In the example shown in FIG. 2, some items are similar to those shown in FIG. 1, and they are similarly numbered. FIG. 2 shows that machine 100 can include a plurality of different sensors 200. As discussed above, sensors 200 can include a yield sensor 201 (which may be camera 150 along with image processing logic, or force sensor(s), or another sensor), loss sensors 148, 152, one or more orientation sensors 202, position sensor 157, machine setting sensors 206, crop engagement sensors 208, operator input sensors 210, and it can include a wide variety of other sensors 212. As discussed above, yield sensors 201 can include a sensor that senses the mass flow rate of crop moving through the grain elevator 130 into the clean grain tank 132. Loss sensors 148, 152 can be those described above as well. Orientation sensors 202 can include accelerometers or other sensors that sense the orientation of machine 100. Machine settings sensors 206 can sense the various machine settings that can be set on machine 100. Some of the settings include rotor speed, fan settings, concave and sieve clearance settings, among a wide variety of others. Crop engagement sensors 208 illustratively sense whether the header on machine 100 is fully engaged with the crop, partially engaged, etc. For instance, they can include crop sensors on the header which may be mechanical sensors, optical sensors, ultrasonic sensors, or other sensors. The sensors can be used to sense what portion of the header is currently engaging crop. As machine 100 is steering into a cut of crop, sensors 208 will generate a sensor value that increases, or otherwise changes indicating that the machine 100 is more fully engaging crop. If machine 100 is being steered out of a cut, then sensors 208 illustratively generate a sensor signal that changes over time to indicate that the header is engaging less crop, as time proceeds.

Operator input sensors 210 can generate a signal indicative of operator inputs. Those inputs can include steering inputs, inputs that change the settings of the machine 100, acceleration and deceleration inputs, inputs indicative of various thresholds or other values (some of which are discussed below), among other things.

FIG. 2 also shows that machine 100 illustratively includes one or more processors 214, data store 216, dynamic event detection system 218, dynamic event correction system 220, signal conditioning system 222, material aggregation system 224 (which can include integrator 280 and other items 282), map generator 226, communication system 228, operator interface mechanisms 230, control system 232, and controllable subsystems 234. It can include a wide variety of other items 236 as well.

FIG. 2 also shows that machine 100 can be operated by operator 238 and can communicate with other systems 242 over network 240. Remote system 242 can include a vendor system, a farm manager system or other remote systems. Before describing the overall operation of machine 100, a brief description of some of the items in machine 100, and their operation, will first be provided. Operator interface mechanisms 230 can be actuated by operator 238 to control and manipulate machine 100. Therefore, they can take a wide variety of different forms, such as levers, pedals, switches, touch sensitive displays, microphones and speakers (where speech recognition and speech synthesis are provided), steering wheels, joysticks, etc.

Communication system 228 enables the items in machine 100 to communicate with one another. It also illustratively enables machine 100 to communicate over network 240, with one or more remote system 242. Network 240 can be a local area network, a near field communication network, a wide area network, a cellular communication network, or any other of a variety of different networks or combinations of networks. Therefore, communications system 228 may vary, depending on the type of communication it is to enable.

Data store 216, itself, can include dynamic event detection thresholds 244, pre-defined event-based correction transfer functions 246, machine characteristics 248, corrected signal data 250, and it can include a wide variety of other items 252. Dynamic event detection system 218, itself, can include signal selector 254, rate of change (acceleration) identifier logic (or derivative generator) 256, and it can include other items 258. Dynamic event correction system 220 can, itself, include a correction transfer function identifier 260, correction application system 262, output generator 264, and/or other items 266. Correction transfer function identifier 260 can include correction magnitude identifier 268, correction span identifier 270, event-based retrieval logic 272, and it can include other items 274.

Signal conditioning system 222 illustratively receives sensor signals from one or more sensors 200, and can perform conditioning operations on those signals. The conditioning operations can include filtering, normalizing, amplifying, linearizing, etc. Dynamic event detection system 218 illustratively receives the conditioned sensor signals and detects dynamic events that may affect the accuracy of one or more performance characteristic sensors. For instance, it can detect dynamic events that machine 100 is experiencing, that may temporarily affect the accuracy of the yield signal generated by the yield sensors 201, or the loss signal generated by the loss sensors 148, 152. Signal selector 254 selects one of the signals that can be used to determine whether a dynamic event is present. Rate of change identifier logic 256 detects the rate of change of the selected signal to determine whether the dynamic event is present. For instance, derivatives of the position signals generated by position sensors 204 can be taken to determine the rate of movement and acceleration of machine 100. This can be used to determine whether machine 100 is accelerating or decelerating. The orientation sensor signal from sensors 202 can also have its derivative, or second derivative, taken to determine whether the orientation of the machine is changing (such as whether it is tilting or rocking because machine 100 is going over a bump, through a dip, transitioning uphill or downhill, etc.). The derivative of the machine setting sensor signals generated by sensors 206 can be taken to determine whether the settings have just been changed, or are changing quickly. The derivative of the crop engagement sensor 208 can be taken to determine whether the machine is quickly engaging more or less crop. The rate of change identifier logic 256 can be used to determine the rate of change of other signals as well, in an attempt to identify whether dynamic events are taking place.

Dynamic event detection thresholds 254 can be thresholds that correspond to the different signals that are used to detect dynamic events. Therefore, threshold comparison logic can access one of the dynamic event detection thresholds 244 and compare the rate of change of the selected signal to the rate of change thresholds corresponding to the different dynamic events. If the rate of change meets one of the threshold values, then dynamic event detection system 218 generates an output indicative of a dynamic event that is taking place. This is done by output generator 259. The dynamic event can be identified in the output generated by output generator 259, as well as the extent to which the rate of change of the selected signal exceeded the threshold. Output generator 259 can provide the output with other information or in different forms as well.

Once a dynamic event has been detected, and identified, then dynamic event correction system 220 generates a correction value that can be applied to the yield signal (or other performance characteristics sensor signal) that has inaccuracies induced by the dynamic event. Correction transfer function identifier 260 can identify a transfer function that can be applied to the yield signal (or other signal) to correct it. It can dynamically calculate the correction transfer function or retrieve a pre-defined correction transfer function based on characteristics of the correction to be made (such as the magnitude, span, the dynamic event, etc.). Therefore, correction magnitude identifier 268 can identify the magnitude of the correction that is needed. Correction span identifier 270 can identify the span of the yield signal over which the correction is to be applied and/or event-based retrieval logic 272 can retrieve the particular event-based correction transfer function 246, corresponding to the dynamic event that was detected. Correction magnitude identifier 268 can modify the magnitude of the retrieved transfer function, and correction span identifier 270 can stretch it, or shrink it, along a time axis, so that it properly corrects the yield signal.

Correction application system 262 then applies the correction transfer function to the yield signal, at the correct time, and over the correct timespan, in order to correct it for the dynamic event that was detected. Output generator 264 generates an output indicative of the corrected yield signal so that it can be stored as corrected signal data 250.

In one example, the magnitude of the error that needs to be corrected (e.g., the magnitude of the sensor response to the dynamic event), and that was induced by the dynamic event, is based on the amount of grain in each crop-flow subsystem when the error occurred. Therefore, material aggregation system 224 illustratively includes integrator 280, and it can include other items 282. Integrator 280 integrates over the recent yield signal to identify a metric indicative of the quantity of grain that is in each crop-flow subsystem in machine 100 (such as those shown in FIG. 1A), when the detected dynamic event occurred. Thus, correction magnitude identifier 268 retrieves the metric, that indicates the amount of grain in each subsystem when the dynamic event occurred, to identify the magnitude of error that was introduced in each subsystem.

Map generator 226 can use the corrected signal data 250 to generate a yield map, that is more accurate, because it is based on the corrected signal data 250. Similarly, communication system 228 can communicate this information to one or more remote systems 242.

Control system 232 can receive inputs from the sensors 200, and other sensors, and also from the operator interface mechanisms 230, and other items, and generate control signals that are used to control the controllable subsystems 234. The controllable subsystems can include a propulsion system, a steering subsystem, a settings subsystem, among other things. The propulsion system can be used to control the propulsion (acceleration, deceleration, speed, etc.) of machine 100 for example: to achieve a more constant feed-rate of biomass. The steering subsystem can be used to control the direction of travel of machine 100. The settings subsystem can be used to automatically control the settings on machine 100. These are just some examples of controllable subsystems that can be controlled by control system 232 based upon the corrected values of yield, grain loss, grain quality, or other signal.

Figure 2A:
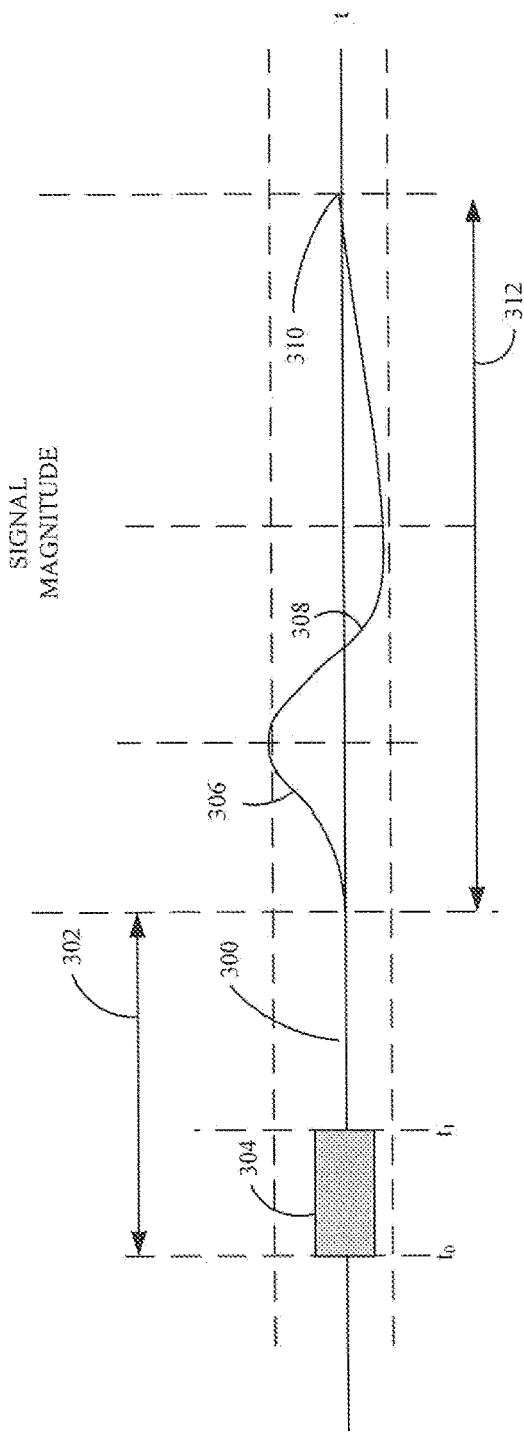
FIG. 2A shows one example of a sensor response to a dynamic event.
Figure 2B:
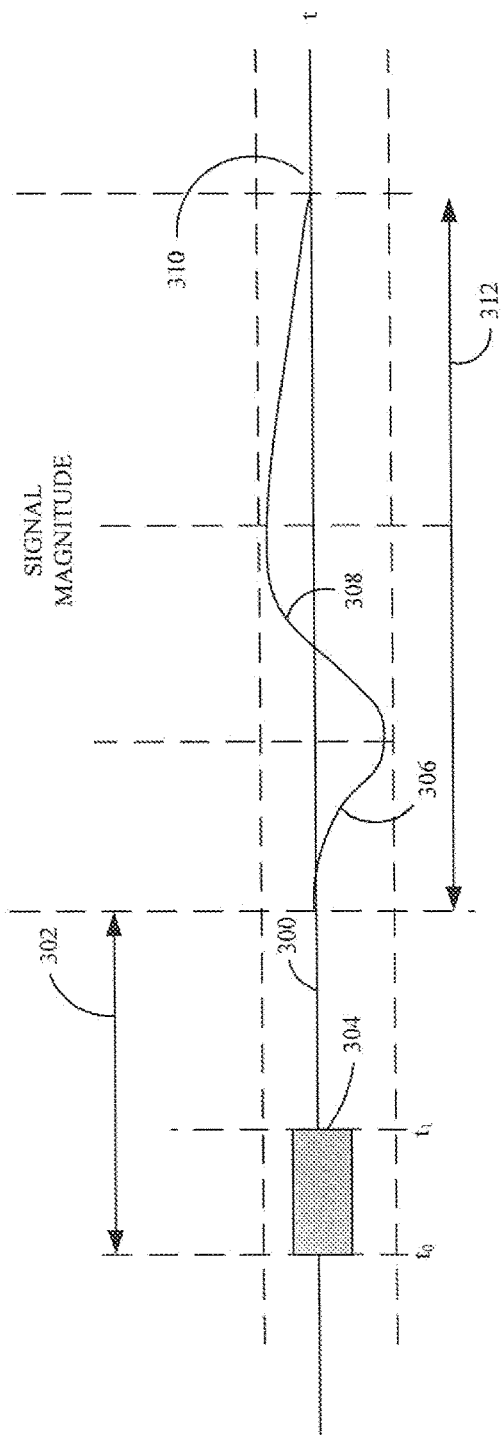
FIG. 2B shows another example of a sensor response to a dynamic event.
Figure 2D:
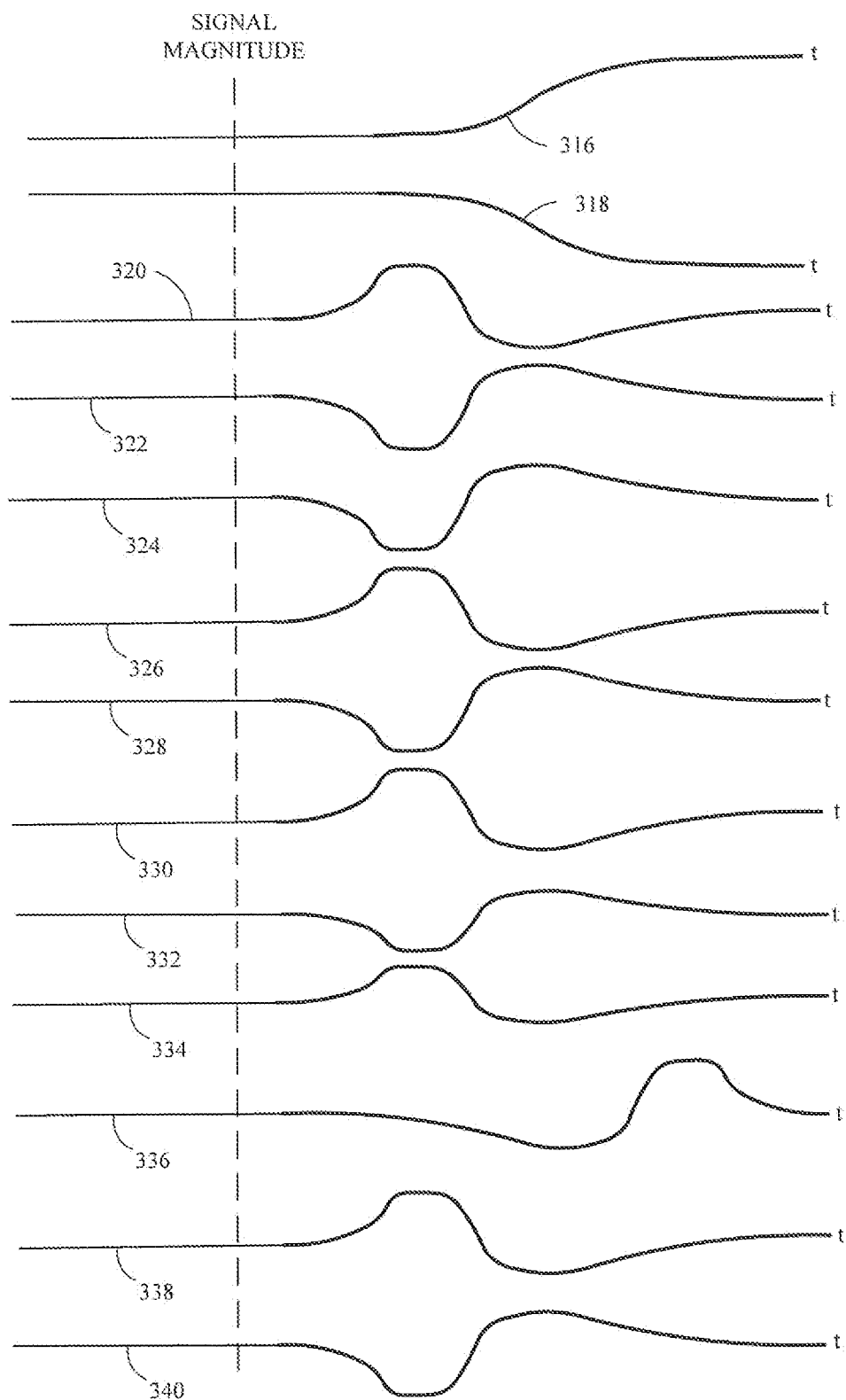
FIG. 2D shows a plurality of different sensor response to a plurality of different dynamic events.

As discussed above, the dynamic events can introduce errors into the yield signal in the form of transfer functions that shift mass to different times in the machine crop-flow processing. FIGS. 2A and 2B show the affect of dynamic events, on the yield signal, that cause positive, and negative effects, respectively. FIG. 2C shows one example of a dynamic event that causes a change and hold type distortion or inaccuracy in the yield signal. FIG. 2D shows a plurality of different sensor responses to a plurality of different dynamic events. Once the sensor responses illustrated in FIG. 2D are known, characterized, and correlated to dynamic events, then they can be used for correction by using them in identifying a dynamic event and/or the magnitude and timespan over which an opposing transfer function can be applied to correct the yield signal.

Referring again to FIG. 2A, it can be seen that a dynamic event occurs from time to $t_0$. There is a delay 302 between the occurrence of the dynamic event and when that dynamic event starts to affect the yield signal shown at 300 in FIG. 2A. After the delay 302, it can be seen that the dynamic event 304 causes the yield signal 300 to increase in value as indicated at 306. The yield signal then begins decreasing in value at 308 and slowly returns to its nominal value at 310. The length of the affect is thus illustrated by arrow 312 in FIG. 2A. The dynamic event illustrated in FIG. 2A is referred to as a "positive" dynamic event in that it initially causes the yield signal to increase, and then decrease before settling out. FIG. 2B shows a negative dynamic event. Some items are similar to those shown in FIG. 2A and they are similarly numbered. In the example shown in FIG. 2B, dynamic event 304 initially causes the yield signal 300 to move negatively at 306, and then to recover positively at 308 before settling to its nominal value at 310.

FIG. 2C shows the effect of a "change and hold" dynamic event. Again, some items are similar to those shown in FIGS. 2A and 2B, and they are similarly numbered. However, the change and hold event may be a variety of different things, such as a change in machine settings. It may occur at time to. However, there will still normally be a delay 302 before the yield signal 300 shows the effect of the setting change at time t0. Therefore, as shown in FIG. 2C, after delay 300, the yield signal shows an effect in region 314 where it changes values based on the settings change at time to. However, the yield signal then holds the new value, as its nominal value, as indicated at 316.

FIG. 2D shows a plurality of different sensor responses, as a function of time, based upon a plurality of different dynamic events. These sensor responses can be characterized before operation begins and correlated to predefined corrective transfer functions and detected dynamic events, so that when they are detected during operation, the predefined corrective transfer functions can be returned and applied. Alternatively, the sensor responses shown in FIG. 2D can be detected during operation. and used to calculate a corrective transfer function, that is essentially a mirror image of the sensor response, that can be applied to the sensor output (the yield signal) to correct it for the dynamic event. Signal 316 shows a sensor response, as a function of time, for a dynamic event which corresponds to the harvester 100 entering into the crop at the beginning of a cut. This results in a relatively rapid increase in yield. Response 318 shows the effect of a dynamic event where the harvester is exiting out of a crop. This results in a relatively rapid decrease in yield. Response 320 illustrates the effect on the yield signal of a rapid slow down (deceleration), and response 322 illustrates the effect on the yield signal of a rapid speed up (acceleration). The machine deceleration is the dynamic event corresponding to sensor response 320, and the machine acceleration is the dynamic event corresponding to the sensor response 322.

Sensor responses 324 and 326 correspond to a rapid pitch upward, and a rapid pitch downward, of the harvesting machine 100, respectively. Sensor responses 328 and 330 correspond to a rapid roll left and a rapid roll right, respectively, of the harvesting machine 100 about its longitudinal axis from front to back. Responses 332 and 334 correspond to a rapid yaw to the left, and a rapid yaw to the right (which may occur when the harvesting machine 100 is turning), respectively. Response 336 corresponds to a dynamic event in which a crop slug (or a large clump, or grouping of crop) is fed through the machine. When this occurs, there is often a delay in crop processing, where the clump occurs, and then a "catch up" response as shown by the sensor response 336.

Responses 338 and 340 correspond to a rapid change in system settings that reduce processing time, and that increase processing time, respectively. For instance, response 338 may be seen where there is a rapid change in system settings that increase cross auger speed, engine speed, or rotor RPMs. Response 340 may correspond to a rapid change in system settings that increases processing time, such as a decrease in cross auger speed, engine speed or rotor RPMs.

Figure 3:
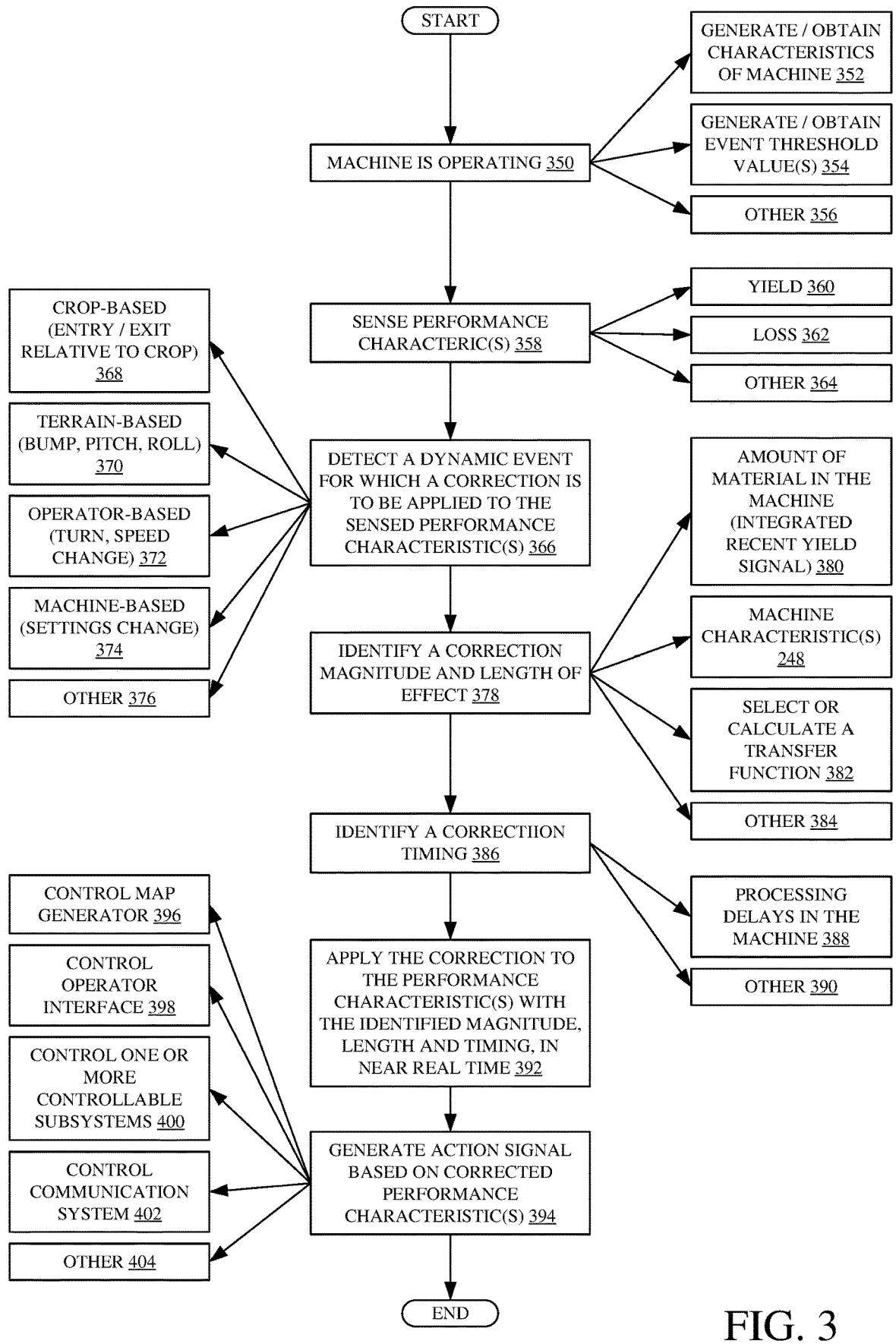
FIG. 3 is a flow diagram illustrating one example of the operation of the mobile agricultural harvesting machine shown in FIG. 1, in detecting dynamic events and performing correction operations to correct sensed performance characteristics based on the detected dynamic events.

FIG. 3 is a flow diagram illustrating one example of the operation of mobile agricultural harvesting machine 100, in detecting dynamic events that affect a performance characteristic sensor signal (in this case, it will be described in terms of the yield signal, but other signals could be used as well), and in determining and applying a correction to the yield signal, based upon the detected dynamic event. It is first assumed that machine 100 is operating, or is about to operate in a field. This is indicated by block 350 in the flow diagram of FIG. 3. At some point, the machine characteristics 248 will be generated or obtained, as will any dynamic event detection thresholds 244. Generating or obtaining the machine characteristics is indicated by block 352, and it can be done in a number of ways. The machine characteristics may be obtained by populating a look-up table into data store 216 or other computing device on the combine when the device is installed. In another example, it may be that machine characteristics (such as make, model, machine dimensions, etc.) are sensed or automatically detected. In another example, the machine dimensions, operating characteristics, and other characteristics may be downloaded from a remote system 242. They may also be input by the operator.

Generating the event threshold values 244 is indicted by block 354 in the flow diagram of FIG. 3. These threshold values can also be dynamically generated on the machine 100, downloaded from remote systems 242, input by the operator, etc. The machine can be operated and configured in other ways as well, and this is indicated by block 346.

A performance characteristic of the machine 100 is then sensed by one of sensors 200. This is indicated by block 358 in the flow diagram of FIG. 3. In one example, the performance characteristic is yield 360 that is sensed by yield sensor 201. In another example, the performance characteristic is loss 362 that is sensed by the loss sensor 148, 152. The sensed performance characteristic can be any of a wide variety of other characteristics including grain quality 364 as well.

Dynamic event detection system 218 then detects a dynamic event for which a correction is to be applied to the sensed performance characteristic. Again, the present description will proceed with respect to the sensed performance characteristic being yield, but this is described by way of example only. Detecting the dynamic event is indicated by block 366 in the flow diagram of FIG. 3.

The dynamic events can be any of a wide variety of dynamic events that induce accelerations on the machine 100, changes in orientation, changes in processing speed, etc. Therefore, they can be crop-based dynamic events 368, such as entry into, and exit from, the crop. They can be terrain-based dynamic events 370, such as traveling over a bump, or traversing a hillside, which causes a pitch or roll of the machine, etc. They can be operator-based dynamic events 372, such as turning the machine (which induces a yaw component in the machine dynamics), a speed change (which results in accelerations and decelerations, etc.). The dynamic events can be machine-based dynamic events 374, such as changes in machine settings (e.g., increases or decreases in cross auger speed, engine speed, rotor RPM, etc.) or crop slugs feeding through the machine. The dynamic event can be any of a wide variety of other dynamic events 376 that may affect the crop characteristic sensor signal.

As is discussed in greater detail below with respect to FIG. 4, dynamic event detection system 218 can use signal selector 254 to select one or more of the sensor signals from sensor 200, which are used to detect dynamic events. In one example, the rate of change of different sensor signals can indicate different dynamic events. Therefore, rate of change identifier logic 256 detects or determines a rate of change of the selected signal, and threshold comparison logic 257 retrieves a dynamic event detection threshold 244 and compares the rate of change of the selected signal against that threshold. Each of the different dynamic events that is being detected may have a different detection threshold 244.

For example, to detect a first dynamic event, it may be that a first sensor signal must be changing at a rate which exceeds a first threshold value. To detect a second dynamic event, it may be that the same sensor signal, or a different one, must be changing at a rate that exceeds a second threshold value, and so on. For example, as discussed above with respect to FIG. 1A, one or more dynamic events may affect multiple different subsystems.

Output generator 259 generates an output indicative of whether a dynamic event is detected. It may output an identifier that identifies the particular dynamic event. It may output an indication as to how much the signal exceeded the threshold, and/or it may output a variety of other information corresponding to the detected dynamic event as well.

Dynamic event correction system 220 then determines an event-based correction transfer function 246. It can retrieve a pre-defined one from data store 216, or it can calculate one. Thus, system 220 can identify a correction magnitude and length of correction corresponding to the dynamic event. This is indicated by block 378. Correction magnitude identifier 268 may determine the magnitude based on an amount of grain or harvested material that is currently in the machine. For instance, if there is an acceleration on the machine, then the amount of grain that is thrown into, or delayed from reaching, an auger, will vary, depending on the amount of material in the particular upstream crop-flow subsystem (as illustrated in FIG. 1A) at that time. Thus, in that example, the amount of material in the upstream crop flow subsystem will be a component in determining the magnitude of the error in the yield signal induced by the acceleration of the machine. Determining the amount of material in the machine is indicated by block 380 in the flow diagram of FIG. 3. The magnitude may also be determined based on the machine characteristics (such as the size of the machine, the dimensions or geometry of the grain holding facilities in the machine, the auger sizes and speeds, etc.).

Correction span identifier 270 then determines a timespan over which the error occurs (and thus over which the correction transfer function is to be applied). For instance, the magnitude of the error in the yield signal may be spread out over time, as shown in the sensor responses in FIG. 2D. The yield signal may, for instance, increase rapidly, and then decrease slowly. It may increase rapidly, then decrease rapidly, then return to its nominal value relatively slowly. These timing characteristics corresponding to the correction signal may also be based on the amount of material in the machine subsystem, the particular dynamic event that was detected, the speed of the machine at that time, the magnitude of the dynamic event (such as whether there was a large acceleration, or a relatively small acceleration, whether the machine moved rapidly through a relatively large pitch angle, or a small pitch angle, whether the machine rolled through a large or small angle, etc.). Correction span identifier 270 thus uses these items to determine the span over which the correction value is to be applied.

Event-based retrieval logic 278, once it knows the characteristics of the correction transfer function (such as the identity of the dynamic event, the magnitude and span of the correction value, etc.) then retrieves (or otherwise determines) the corresponding event-based correction transfer function 246 from data store 216. In another example, logic 272 can also be used to calculate the transfer function dynamically, in near real-time. Retrieving or calculating the event-based correction transfer function 246 is indicated by block 382 in the flow diagram of FIG. 3. The correction magnitude and length of correction may be determined in other ways as well, and this is indicated by block 384.

Correction application system 262 then determined a correction timing. This indicates where, in the yield signal, the correction is to be applied. Determining the correction timing is indicated by block 386 in the flow diagram of FIG. 3. This can be based on processing delays in the machine as indicated by block 388. Those processing delays can be sensed or calculated based upon sensed machine characteristics, such as engine speed, auger speed, machine speed, machine model, dimensions, etc. The correction timing can be identified in a wide variety of other ways as well, and this is indicated by block 390.

Once the magnitude and span of the correction have been determined (whether calculated or retrieved from data store 216), and once the position in the yield signal where the correction is to be applied has been identified, then correction application system 262 applies the correction to the performance characteristics with the identified magnitude, length and timing, in near real-time. This is indicated by block 392.

Output generator 264 generates an output indicative of the corrected signal. Control system 232 can then generate an action signal to control one or more of the controllable subsystems 234, the map generator 226, the communication system 228 and/or the operator interface mechanisms 230, based on the corrected performance characteristic. This is indicated by block 394. For instance, control system 232 can generate an action signal to control map generator 226 to map the corrected yield value to a geographic location, instead of the erroneous or inaccurate yield value. Controlling the map generator is indicated by block 396. Control system 232 can control operator interface mechanisms 230 to surface the corrected yield signal for operator 238. This is indicated by block 398 in the flow diagram of FIG. 3. Control system 232 can control one or more of the controllable subsystems 234, based upon the corrected yield signal. This is indicated by block 400. Control system 232 can control communication system 228 to send the corrected yield signal to remote systems 242, or elsewhere. Controlling the communication system is indicated by block 402. An action signal can be generated in a wide variety of other ways, to control a wide variety of other items as well. This is indicated by block 404.

Figure 4:
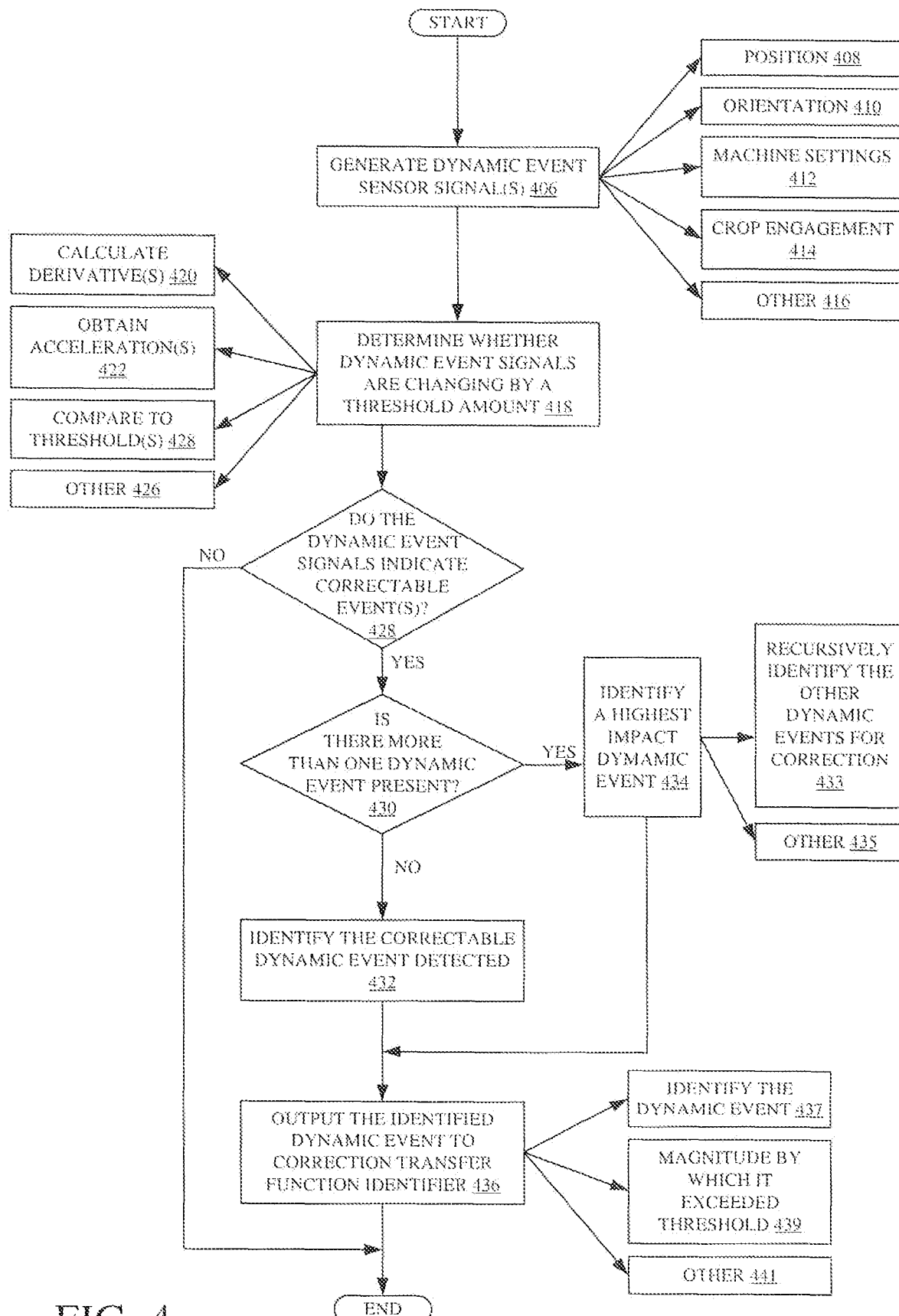
FIG. 4 is a flow diagram illustrating one example of the operation of a dynamic event detection system and dynamic event correction system in detecting a dynamic event and performing a correction operation, in more detail.

FIG. 4 is a flow diagram illustrating one example of how dynamic event detection system 218 detects dynamic events that are to be corrected, and how dynamic event correction system 220 corrects for the effects of those events on the yield signal. It is first assumed that sensors 200 generate dynamic event sensor signals, which are those sensor signals that can be used to detect a dynamic event for which a yield correction is to be applied. Generating the dynamic event sensor signals is indicated by block 406 in the flow diagram of FIG. 4. Such signals can include sensed position 408 sensed by position sensor 204. It can be machine orientation 410 sensed by orientation sensor 202. It can be machine settings 412 sensed by machine setting sensors 206. It can be a crop engagement (e.g., whether the harvester is entering or exiting the crop, or is fully engaged with the crop) 414, which may be sensed by crop engagement sensors 208. It can be a wide variety of other items 416 that are sensed by other sensors.

The sensor signals are received at dynamic event detection system 218 and signal selector 254 selects one or more of the signals for evaluation to determine whether dynamic event signals are changing by a threshold amount, which may indicate the presence of a dynamic event. Rate of change (acceleration) identifier logic makes the determination as to a rate at which the signals are changing. Threshold comparison logic 257 compares the rate of change of the signals with a corresponding threshold value to determine whether they are changing by a threshold amount. Determining whether the dynamic event sensor signals are changing by a threshold amount is indicted by block 418 in the flow diagram of FIG. 4.

In one example, logic 218 calculates one or more derivatives of the signals to determine their rate of change. For instance, if the sensor signal being evaluated is a position signal 408 generated from position sensors 204, then rate of change identifier logic 256 can calculate the first derivative of the position signal with respect to time to obtain velocity, and the second derivative to obtain an acceleration. The same can be performed with respect to the orientation 410. Its first derivative can be calculated to determine the velocity of change in orientation, and the second derivative can be calculated to determine the acceleration in the change in orientation. Calculating the derivatives is indicated by block 420. Obtaining the acceleration values (whether they are obtained by calculating derivatives, or in other ways, such as using accelerometers), is indicated by block 422.

The accelerations are indicative of accelerations imparted on machine 100, that indicate the presence of a dynamic event, for which yield signal correction may be made. The accelerations are compared to threshold levels to determine whether a correction is to be made. This is indicated by block 424. In one example, threshold comparison logic 257 determines the particular dynamic event that has been detected (such as an acceleration in the pitch or roll direction, rapid engagement or disengagement from the crop, etc.), and accesses data store 216 to obtain a dynamic event detection threshold 249. It compares the acceleration value to the threshold value to determine whether the yield signal is to be corrected for the dynamic event. Determining whether dynamic event signals are changing by a threshold amount can be done in other ways as well, and this is indicated by block 426.

If the dynamic event signals indicate a correctable event (in that they are changing at a rate of change that meets the threshold value) as indicated by block 428, then dynamic event detection system 218 determines whether there is more than one dynamic event taking place at the current time. This is indicated by block 430. For instance, it may be that machine 100 is going over a bump which induces both an acceleration about the pitch axis, and an acceleration about the roll axis. However, it may be that one of these has more of an impact on the yield signal response than another. Similarly, it may be that machine 100 goes over a bump which induces an acceleration about the pitch axis, as it is rapidly engaging the crop. Again, it may be that one of these dynamic events has more of an impact on the yield signal response than the other.

If there is only one dynamic event that has been detected, then output generator 259 generates an output that identifies the correctable dynamic event that has been detected. This is indicated by block 432. However, if more than one dynamic event has been detected, then output generator 259 identifies the dynamic event that will have the highest impact on the yield signal. This is indicated by block 434. For instance, it may be that data store 216 stores a hierarchy of dynamic events. The hierarchy may indicate which dynamic events have the greatest impact on the yield signal, under certain circumstances. In that case, output generator 259 accesses the dynamic event hierarchy to identify which of the detected dynamic events has the highest impact on the yield signal. The output generator can traverse down the hierarchy of events in order to recursively identify the multiple dynamic events to correct the flow timeline if multiple events are present within the same time interval. This is indicated by block 435. The multiple dynamic events can be handled in other ways as well, as indicated by block 437.

Once the correctable dynamic event has been identified (either at block 432 or at block 434), then output generator 259 generates an output indicative of the identified dynamic event to correction transfer function identifier 260. This is indicated by block 436 in the flow diagram of FIG. 4. The output can include a wide variety of different types of information, such as the identity of the dynamic event, a relative magnitude of the dynamic event (the amount by which the dynamic event signal exceeds the threshold), or a wide variety of other things. For instance, if the dynamic event is an acceleration about the roll axis, then output generator 259 may generate an output indicative of the magnitude of the roll (e.g., the degree of the roll angle and how much the acceleration about the roll axis exceeds the threshold value), or a wide variety of other information.

It can thus be seen that the present system identifies correctable errors in performance characteristics (such as sensed yield, loss, etc.) and performs near real-time correction on those values. The corrected values can then be used to generate control signals to control a wide variety of items on machine 100, or in remote systems 242. For instance, they can be used to perform automated control of machine 100, to control map generator 226, to control communication system 228, to control steering or propulsion of machine 100, etc.

The present discussion has mentioned processors and servers. In one example, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 5:
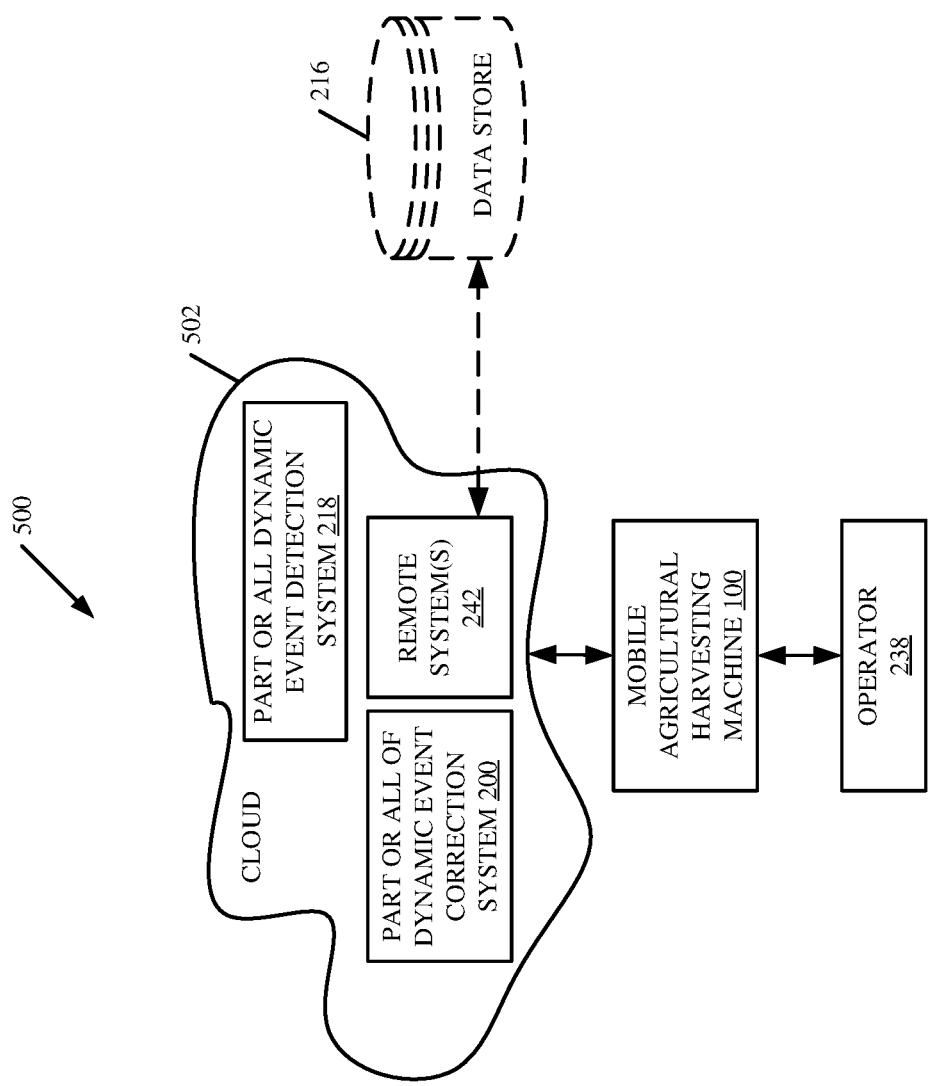
FIG. 5 is a block diagram showing one example of the mobile agricultural harvesting machine illustrated in FIG. 2, deployed in a remote server environment.

FIG. 5 is a block diagram of harvester 100, shown in FIG. 1, except that it communicates with elements in a remote server architecture 500. In an example, remote server architecture 500 can provide computation, software, data access, and storage services that do not require end-user knowledge of the physical location or configuration of the system that delivers the services. In various examples, remote servers can deliver the services over a wide area network, such as the internet, using appropriate protocols. For instance, remote servers can deliver applications over a wide area network and they can be accessed through a web browser or any other computing component. Software or components shown in FIG. 2 as well as the corresponding data, can be stored on servers at a remote location. The computing resources in a remote server environment can be consolidated at a remote data center location or they can be dispersed. Remote server infrastructures can deliver services through shared data centers, even though they appear as a single point of access for the user. Thus, the components and functions described herein can be provided from a remote server at a remote location using a remote server architecture. Alternatively, they can be provided from a conventional server, or they can be installed on client devices directly, or in other ways.

In the example shown in FIG. 5, some items are similar to those shown in FIG. 2 and they are similarly numbered. FIG. 5 specifically shows that map remote systems 242 and some or all of systems 218 and 220 can be located at a remote server location 502. Therefore, harvester 100 accesses those systems through remote server location 502.

FIG. 5 also depicts another example of a remote server architecture. FIG. 5 shows that it is also contemplated that some elements of FIG. 2 are disposed at remote server location 502 while others are not. By way of example, data store 216 can be disposed at a location separate from location 502, and accessed through the remote server at location 502. Regardless of where they are located, they can be accessed directly by harvester 100, through a network (either a wide area network or a local area network), they can be hosted at a remote site by a service, or they can be provided as a service, or accessed by a connection service that resides in a remote location. Also, the data can be stored in substantially any location and intermittently accessed by, or forwarded to, interested parties.

It will also be noted that the elements of FIG. 2, or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 6:
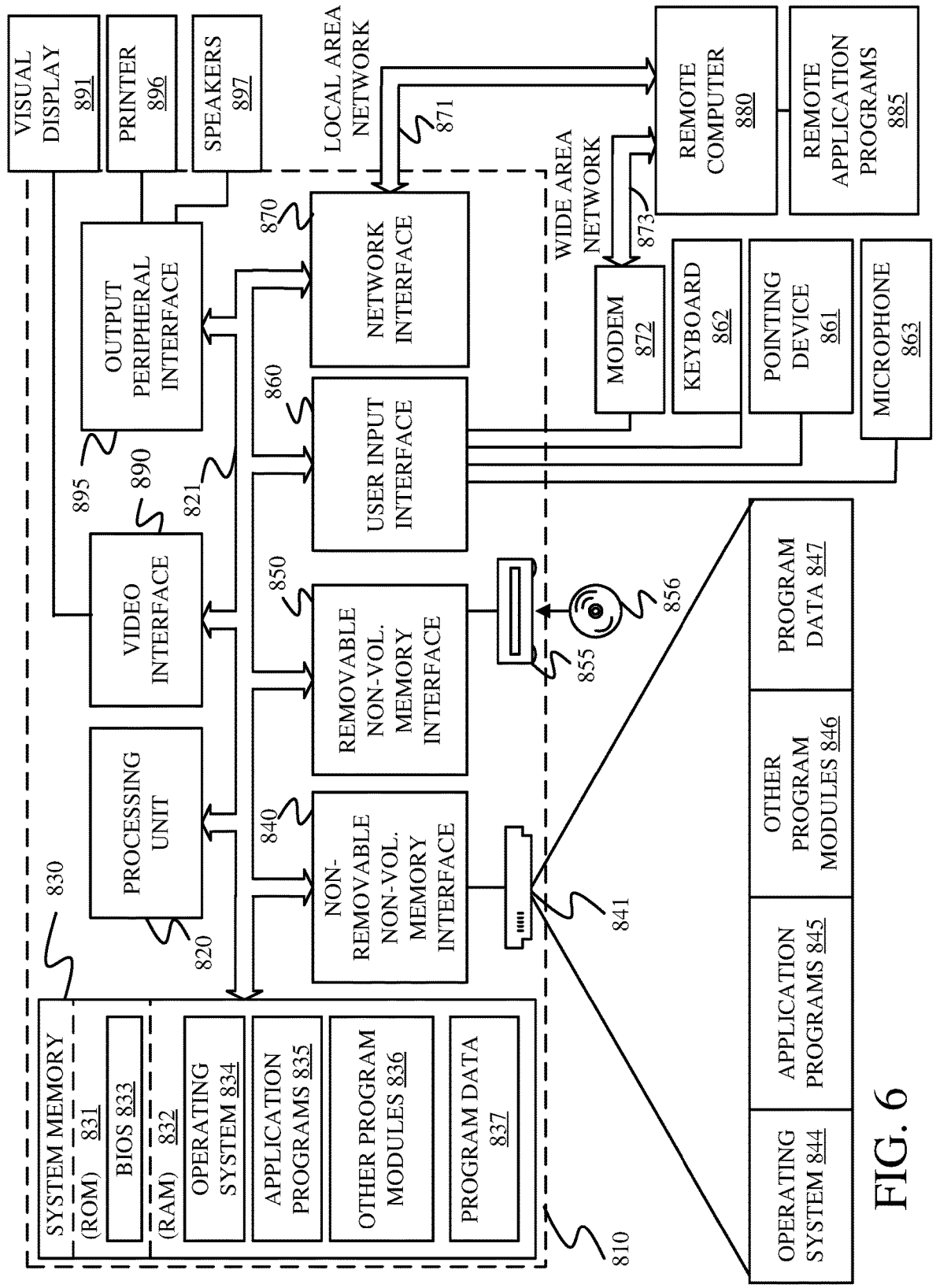
FIG. 6 is a block diagram showing one example of a computing system environment that can be used in the architectures shown in the previous figures.

FIG. 6 is one example of a computing environment in which elements of FIG. 1, or parts of it, (for example) can be deployed. With reference to FIG. 6, an example system for implementing some embodiments includes a computing device, programmed to perform as described above, in the form of a computer 810. Components of computer 810 may include, but are not limited to, a processing unit 820 (which can comprise processors or servers from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to FIG. 2 can be deployed in corresponding portions of FIG. 6.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 6 illustrates operating system 834, application programs 835, other program modules 836, and program data 837.

The computer 810 may also include other removable/non-removable volatile/nonvolatile computer storage media. By way of example only, FIG. 10 illustrates a hard disk drive 841 that reads from or writes to non-removable, nonvolatile magnetic media, an optical disk drive 855, and nonvolatile optical disk 856. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 6, provide storage of computer readable instructions, data structures, program modules and other data for the computer 810. In FIG. 6, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a controller area network—CAN, a local area network—LAN, or wide area network WAN) to one or more remote computers, such as a remote computer 880.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 6 illustrates, for example, that remote application programs 885 can reside on remote computer 880.

It should also be noted that the different examples described herein can be combined in different ways. That is, parts of one or more examples can be combined with parts of one or more other examples. All of this is contemplated herein.

Example 1 is a mobile harvesting machine, comprising:
a performance characteristic sensor that senses a harvesting performance characteristic and generates a performance characteristic sensor signal indicative of the sensed performance characteristic;
a dynamic event characteristic sensor that senses a characteristic indicative of a dynamic event that affects accuracy of the performance characteristic sensor signal and generates a dynamic event sensor signal indicative of the sensed dynamic event characteristic;
a dynamic event detection system that receives the dynamic event sensor signal, detects the dynamic event based on the dynamic event sensor signal, and generates a dynamic event output signal indicative of the detected dynamic event;
a dynamic event correction system that receives the dynamic event output signal and identifies a dynamic event correction transfer function based on the dynamic event output signal; and
a correction application system that applies the dynamic event correction transfer function to the performance characteristic to obtain a corrected performance characteristic.

Example 2 is the mobile harvesting machine of any or all previous examples wherein the dynamic event detection system comprises:
rate of change identifier logic configured to identify a rate of change of the dynamic event sensor signal.

Example 3 is the mobile harvesting machine of any or all previous examples wherein the dynamic event detection system comprises:
threshold comparison logic configured to obtain a dynamic event detection threshold and compare the identified rate of change of the dynamic event sensor signal to the dynamic event detection threshold to detect the dynamic event.

Example 4 is the mobile harvesting machine of any or all previous examples wherein the dynamic event detection system comprises:

an output generator configured to generate the dynamic event output signal identifying the detected dynamic event.

Example 5 is the mobile harvesting machine of any or all previous examples wherein the dynamic event correction system comprises:

a correction magnitude identifier configured to determine a magnitude of correction corresponding to the dynamic event correction transfer function based on the identified detected dynamic event.

Example 6 is the mobile harvesting machine of any or all previous examples and further comprising:

a material aggregation system that identifies an amount of crop in each of the plurality of different material flows subsystems in the mobile harvesting machine when the dynamic event is detected and generates an aggregated crop signal indicative of the amount of crop in each of the plurality of different material flow subsystems in the mobile harvesting machine.

Example 7 is the mobile harvesting machine of any or all previous examples wherein the correction magnitude identifier identifies which of the plurality of different material flow subsystems had material flow that was affected by the dynamic event and determines an amount by which the material flow was affected, based on the aggregated crop signal, the correction magnitude identifier determining the magnitude of correction based on the amount of affected material flow in each material flow subsystem where material flow was affected.

Example 8 is the mobile harvesting machine of any or all previous examples wherein the dynamic event correction system comprises:

a correction span identifier configured to determine a time span corresponding to the dynamic event correction transfer function.

Example 9 is the mobile harvesting machine of any or all previous examples wherein the dynamic event correction system comprises:

event-based retrieval logic configured to retrieve the dynamic event correction transfer function based on the dynamic event identified by the dynamic event output signal.

Example 10 is the mobile harvesting machine of any or all previous examples and further comprising:

an output generator configured to generate an action signal based on the corrected performance characteristic.

Example 11 is the mobile harvesting machine of any or all previous examples and further comprising:

a map generator that generates a map of the performance characteristic and wherein the output generator generates the output signal to control the map generator to generate the map based on the corrected performance characteristic.

Example 12 is a method of controlling a mobile harvesting machine, comprising:

sensing a harvesting performance characteristic;

generating a performance characteristic sensor signal indicative of the sensed performance characteristic;

sensing a characteristic indicative of a dynamic event that affects accuracy of the performance characteristic sensor signal;

generating a dynamic event sensor signal indicative of the sensed dynamic event characteristic;

detecting the dynamic event based on the dynamic event sensor signal;

generating a dynamic event output signal indicative of the detected dynamic event;

determining a dynamic event correction transfer function based on the dynamic event output signal; and correcting the performance characteristic, based on the dynamic event correction transfer function, to obtain a corrected performance characteristic.

Example 13 is the method of any or all previous examples wherein detecting the dynamic event comprises:

determining a rate of change of the dynamic event sensor signal; and detecting the dynamic event based on the identified rate of change.

Example 14 is the method of any or all previous examples wherein detecting the dynamic event comprises:

obtaining a dynamic event detection threshold; and comparing the rate of change of the dynamic event sensor signal to the dynamic event detection threshold to detect the dynamic event.

Example 15 is the method of any or all previous examples wherein correcting the performance characteristic comprises:

determining the dynamic event correction transfer function based on the dynamic event.

Example 16 is the method of any or all previous examples wherein correcting the performance characteristic comprises:

determining a magnitude of correction corresponding to the dynamic event correction transfer function based on the detected dynamic event.

Example 17 is the method of any or all previous examples wherein identifying a magnitude comprises:

identifying an amount of crop in each material flow subsystem of the mobile harvesting machine when the dynamic event is detected; and identifying the magnitude of correction based on the identified amount of crop in each material flow subsystem in the mobile harvesting machine when the dynamic event is detected.

Example 18 is the method of any or all previous examples wherein correcting the performance characteristic comprises:

determining a time span corresponding to the dynamic event correction transfer function.

Example 19 is a control system for controlling a mobile harvesting machine, comprising:

a performance characteristic sensor sensing a harvesting performance characteristic and generating a performance characteristic sensor signal indicative of a sensed performance characteristic;

a dynamic event sensor that senses a dynamic event characteristic indicative of a dynamic event that affects accuracy of the performance characteristic sensor signal and generates a dynamic event sensor signal indicative of the sensed dynamic event characteristic;

one or more processors; and memory storing instructions which, when executed by the one or more processors, cause the one or more processors to perform steps, comprising:

detecting the dynamic event based on the dynamic event sensor signal;

generating a dynamic event output signal indicative of the detected dynamic event; and identifying a dynamic event correction transfer function based on the dynamic event output signal; and correcting the performance characteristic, based on the dynamic event correction transfer function, to obtain a corrected performance characteristic.

Example 20 is the control system of any or all previous examples wherein detecting the dynamic event comprises:
identifying a rate of change of the dynamic event sensor signal;
obtaining a dynamic event detection threshold; and
comparing the identified rate of change of the dynamic event sensor signal to the dynamic event detection threshold to detect the dynamic event.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A mobile harvesting machine comprising:
    a performance characteristic sensor that senses a harvesting performance characteristic and generates a performance characteristic sensor signal indicative of the sensed performance characteristic;
    a dynamic event characteristic sensor that senses a characteristic indicative of a dynamic event that affects accuracy of the performance characteristic sensor signal and generates a dynamic event sensor signal indicative of the sensed dynamic event characteristic;
    a dynamic event detection system that receives the dynamic event sensor signal, detects the dynamic event based on the dynamic event sensor signal, and generates, a dynamic event output signal indicative of the detected dynamic event;
    a dynamic event correction system that receives the dynamic event output signal and identifies a dynamic event correction transfer function based on the dynamic event output signal, the dynamic event correction system comprising:
        a correction magnitude identifier configured to determine a magnitude of correction corresponding to the dynamic event correction transfer function based on the identified detected dynamic event; and
    a correction application system that applies the dynamic event correction transfer function to the performance characteristic to obtain a corrected performance characteristic.

2. The mobile harvesting machine of claim 1, wherein the dynamic event detection system comprises:
    rate of change identifier logic configured to identify a rate of change of the dynamic event sensor signal.

3. The mobile harvesting machine of claim 2, wherein the dynamic event detection system comprises:
    threshold comparison logic configured to obtain a dynamic event detection threshold and compare the identified rate of change of the dynamic event sensor signal to the dynamic event detection threshold to detect the dynamic event.

4. The mobile harvesting machine of claim 1, wherein the dynamic event detection system comprises:
    an output generator configured to generate the dynamic event output signal identifying the detected dynamic event.

5. The mobile harvesting machine of claim 1 and further comprising:
    a material aggregation system that identifies an amount of crop in each of a plurality of different material flows subsystems in the mobile harvesting machine when the dynamic event is detected and generates an aggregated crop signal indicative of the amount of crop in each of the plurality of different material flow subsystems in the mobile harvesting machine.

6. The mobile harvesting machine of claim 5, wherein the correction magnitude identifier identifies which of the plurality of different material flow subsystems had material flow that was affected by the dynamic event and determines an amount by which the material flow was affected, based on the aggregated crop signal, the correction magnitude identifier determining the magnitude of correction based on the amount of affected material flow in each material flow subsystem where material flow was affected.

7. The mobile harvesting machine of claim 1, wherein the dynamic event correction system comprises:
    a correction span identifier configured to determine a time span corresponding to the dynamic event correction transfer function.

8. The mobile harvesting machine of claim 4, wherein the dynamic event correction system comprises:
    event-based retrieval logic configured to retrieve the dynamic event correction transfer function based on the dynamic event identified by the dynamic event output signal.

9. The mobile harvesting machine of claim 8 and further comprising:
    an output generator configured to generate an action signal based on the corrected performance characteristic.

10. The mobile harvesting machine of claim 9 and further comprising:
    a map generator that generates a map of the performance characteristic and wherein the output generator generates the output signal to control the map generator to generate the map based on the corrected performance characteristic.

11. A method of controlling a mobile harvesting machine, the method comprising:
    sensing a harvesting performance characteristic using a performance characteristic sensor;
    generating a performance characteristic sensor signal indicative of the sensed performance characteristic;
    sensing, with a dynamic event characteristic sensor, a characteristic indicative of a change in orientation of the mobile harvesting machine, as a dynamic event, that affects accuracy of the performance characteristic sensor signal;
    generating a dynamic event sensor signal indicative of the sensed dynamic event characteristic;
    detecting the dynamic event based on the dynamic event sensor signal using a dynamic event detection system;
    generating a dynamic event output signal indicative of the detected dynamic event;
    determining a dynamic event correction transfer function based on the dynamic event output signal; and
    correcting the performance characteristic, using correction application system, based on the dynamic event correction transfer function, to obtain a corrected performance characteristic.

12. The method of claim 11, wherein detecting the dynamic event comprises:
    determining a rate of change of the dynamic event sensor signal; and
    detecting the dynamic event based on the identified rate of change.

13. The method of claim 12, wherein detecting the dynamic event comprises:
obtaining a dynamic event detection threshold; and
comparing the rate of change of the dynamic event sensor signal to the dynamic event detection threshold to detect the dynamic event.

14. The method of claim 11, wherein correcting the performance characteristic comprises:
determining the dynamic event correction transfer function based on the dynamic event.

15. The method of claim 11, wherein correcting the performance characteristic comprises:
determining a magnitude of correction corresponding to the dynamic event correction transfer function based on the detected dynamic event.

16. The method of claim 15, wherein identifying a magnitude comprises:
identifying an amount of crop in each material flow subsystem of the mobile harvesting machine when the dynamic event is detected; and
identifying the magnitude of correction based on the identified amount of crop in each material flow subsystem in the mobile harvesting machine when the dynamic event is detected.

17. The method of claim 16, wherein correcting the performance characteristic comprises:
determining a time span corresponding to the dynamic event correction transfer function.

18. A control system for controlling a mobile harvesting machine, the control system comprising:
a performance characteristic sensor sensing a harvesting performance characteristic and generating a performance characteristic sensor signal indicative of a sensed performance characteristic;
a dynamic event sensor that senses a dynamic event characteristic indicative of a dynamic event that affects accuracy of the performance characteristic sensor signal and generates a dynamic event sensor signal indicative of the sensed dynamic event characteristic;
one or more processors; and
memory storing instructions which, when executed by the one or more processors, cause the one or more processors to perform steps, comprising:
detecting the dynamic event based on the dynamic event sensor signal;
generating a dynamic event outran signal indicative of the detected dynamic event; and
identifying a dynamic event correction transfer function based on the dynamic event output signal;
correcting the performance characteristic, based on the dynamic event correction transfer function, to obtain a corrected performance characteristic; and
determining a magnitude of correction corresponding to the dynamic event correction transfer function based on the identified detected dynamic event.

19. The control system of claim 18, wherein detecting the dynamic event comprises:
identifying a rate of change of the dynamic event sensor signal;
obtaining a dynamic event detection threshold; and
comparing the identified rate of change of the dynamic event sensor signal to the dynamic event detection threshold to detect the dynamic event.

* * * * *